(12) United States Patent
Carcy et al.

(10) Patent No.: US 8,776,360 B2
(45) Date of Patent: Jul. 15, 2014

(54) WORKSHOP FOR PREPARING AIRCRAFT ENGINES FOR SHIPPING

(75) Inventors: Bernard Francois Carcy, Soisy sur Seine (FR); Christophe Andre Cheneau, Perthes en Gatinais (FR); Jacques Georges Philippe Guerin, Boussy Saint Antoine (FR); Henri Muzellec, Draveil (FR)

(73) Assignee: SNECMA, Paris (FR)

( * ) Notice: Subject to any disclaimer, the term of this patent is extended or adjusted under 35 U.S.C. 154(b) by 423 days.

(21) Appl. No.: 13/257,076

(22) PCT Filed: Feb. 26, 2010

(86) PCT No.: PCT/FR2010/000177
§ 371 (c)(1),
(2), (4) Date: Oct. 11, 2011

(87) PCT Pub. No.: WO2010/106237
PCT Pub. Date: Sep. 23, 2010

(65) Prior Publication Data
US 2012/0017431 A1    Jan. 26, 2012

(30) Foreign Application Priority Data
Mar. 17, 2009  (FR) .................................... 09 01236

(51) Int. Cl.
*B23P 21/00*    (2006.01)
(52) U.S. Cl.
USPC .................. 29/705; 29/700; 29/709; 29/564; 29/564.1
(58) Field of Classification Search
USPC .................. 29/700, 705, 709, 564.1, 564
See application file for complete search history.

(56) References Cited

U.S. PATENT DOCUMENTS

| | | | |
|---|---|---|---|
| 4,069,764 A | 1/1978 | Teyssedre | |
| 4,395,180 A | 7/1983 | Magnotte | |
| 4,821,217 A | 4/1989 | Jackson et al. | |
| 5,575,607 A | 11/1996 | Grout et al. | |
| 5,653,351 A | 8/1997 | Grout et al. | |
| 6,011,617 A * | 1/2000 | Naudet | 356/237.1 |
| 6,044,696 A * | 4/2000 | Spencer-Smith | 73/118.01 |

(Continued)

FOREIGN PATENT DOCUMENTS

| | | |
|---|---|---|
| CN | 1 915 583 A | 2/2007 |
| EP | 2 006 655 | 12/2008 |
| FR | 2 265 496 | 10/1975 |

OTHER PUBLICATIONS

International Search Report Issued May 6, 2010 in PCT/FR10/000177 filed Feb. 26, 2010.

*Primary Examiner* — Richard Chang
(74) *Attorney, Agent, or Firm* — Oblon, Spivak, McClelland, Maier & Neustadt, L.L.P.

(57) ABSTRACT

A workshop for preparing aeroengines for shipping, the workshop including a station for fitting test and measurement mechanism on an engine, a mechanism for transporting the engine to test premises and for returning the engine to the workshop, a station for removing the test and measurement mechanism, a station for endoscopic inspection, a finishing station, and a shipping station. The engines are transported from one station to another by spreaders fastened on the engines and attached to hoists that are movable in translation along an overhead structure arranged in the workshop, each station being fitted with computer terminals for displaying and tracking the tasks to be performed on the engine in the corresponding station.

15 Claims, 5 Drawing Sheets

(56) References Cited

U.S. PATENT DOCUMENTS

| | | | |
|---|---|---|---|
| 6,697,764 B2 * | 2/2004 | Corby et al. | 702/184 |
| 7,478,470 B2 * | 1/2009 | Mogck et al. | 29/564.1 |
| 8,387,449 B2 * | 3/2013 | Engstrom et al. | 73/116.05 |
| 2005/0022587 A1 * | 2/2005 | Tentrup et al. | 73/116 |
| 2008/0314134 A1 | 12/2008 | Mainville | |

* cited by examiner

WORKSHOP FOR PREPARING AIRCRAFT ENGINES FOR SHIPPING

The invention relates to a workshop for preparing aeroengines for shipping, in general for being fitted on airplanes.

In compliance with regulations, each aeroengine leaving an assembly line is subjected to operating tests performed in premises specially arranged for that purpose. The engine needs to be fitted in a workshop with various test and measurement means that are used during testing and that are removed from the engine after testing, and that are replaced by final pieces of equipment.

Test and measurement means are fitted by a plurality of people onto the engine while it is placed on a transport cart that is used for taking the engine to the test premises and subsequently for returning it to the workshop.

After testing, the removal of the test and measurement means, the inspection of the engine, the fitting of its final pieces of equipment, and the final preparation of the engine for shipping are generally performed at a fixed station while the engine is on a transport cart.

That traditional organization presents certain drawbacks:
- having the engine supported by a transport cart hinders the work of operators by making it difficult for them to access certain portions of the engine, which can be unsafe;
- it is practically impossible to arrange for tasks to be carried out in parallel on the engine, thereby lengthening the time required for preparing engines and increasing the costs of such preparation;
- it is not possible to obtain a view of how tasks are progressing on an engine;
- operators can refer only to printed assembly manuals and to printed labels attached to the engine; and
- it is very difficult, or even impossible, to inspect the tasks carried out by the operators.

A particular object of the invention is to avoid those drawbacks and to improve safety, speed, reliability, and inspection while preparing aeroengines for shipping.

To this end, the invention provides a workshop for preparing aeroengines for shipping, the workshop being characterized in that it comprises:
- a fitting station for fitting measurement and test means on each engine, a removal station for removing the measurement and test means, an inspection station for inspecting the engines by endoscopy, a finishing station for fitting final pieces of equipment on each engine, and a shipping station for fitting each engine on a shipping structure and for placing protective coverings on the engine, these stations being arranged in fixed manner in the workshop along a predetermined path for the engines;
- conveyor and handling means for conveying and handling the engines, which means are carried by an overhead structure extending over the above-mentioned stations and include placing-and-taking means for placing engines on and for taking engines off stationary supports installed in the various stations and designed to give direct access to all portions of the engine, and travel means for moving the engines from one station to another; and
- control means for controlling the conveyor means so that the departure of an engine from any of the above-mentioned stations is followed substantially without delay by the arrival of another engine at that station, with the times spent by the engines in the various stations being identical.

In the workshop of the invention, each person working on an engine has easy access to the various portions of that engine, in particular because the means for conveying and handling the engines are constituted by a fixed structure that extends over the various stations of the workshop, thereby leaving a large amount of space free at floor level and enabling operators to move about without difficulty along the engine and under the engine without being hindered by an engine-transport cart.

Thus, the various tasks to be carried out on an engine may be performed sequentially and always in the same order and at the same locations, thereby facilitating the work of operators and also facilitating the tracking and inspection of those tasks.

According to another characteristic of the invention, the conveyor means comprise hoists guided in translation on horizontal rails of the above-mentioned overhead structure and connected by cables to spreaders fastened to the engines for placing and retrieving the engines.

Advantageously, the cables of the hoists are connected to the spreaders by hooks that are received in funnel-shaped guides secured to the spreaders and that are retained in said guides by locking means that are actuated by actuators.

Thus, moving the engines from one station to another, placing them on the support means installed in a particular station, and taking them off therefrom can be performed in automatic manner.

The engine supports installed in the stations for fitting and removing the measurement and test means comprise vertical uprights fastened to the floor on either side of a location provided for the engine, each upright carrying a horizontal arm for fastening to a casing of the engine, together with means for adjusting the height position of the arms, which means operate synchronously with the adjustment means of the arms of the other uprights such that all of the horizontal fastener arms are always in a common horizontal plane.

In a preferred embodiment of the invention, each of the stations for fitting and removing the test and measurement means are fitted with a pair of front uprights placed in register with the intermediate casing of an engine, and a rear upright placed on one side and in register with the exhaust casing of the engine.

At the station for fitting the test and measurement means, the overhead structure has horizontal rails for moving a hoist for taking an engine from a transport cart situated beside the fitting station, for moving the engine to bring it above the fitting station, and for lowering it to the level of the horizontal arms of the above-mentioned uprights, and subsequently for lifting the engine above the fitting station and for moving and placing the engine on a cart for transporting it to test premises.

In similar manner, at the removal station, the overhead structure includes horizontal rails for moving a hoist above the removal station for taking an engine from a transport cart situated beside the removal station, for moving the engine to bring it above the removal station, and for lowering the engine to the level of the horizontal arms of the above-mentioned uprights, and subsequently for lifting the engine above the removal station and for moving it to the inspection station.

In the inspection and finishing stations, the engine supports comprise respective pairs of vertical columns situated on either side of a location provided for the engine in each of said stations, the columns being suspended from the above-mentioned overhead structure with their bottom ends being located above the floor at a height that is greater than the diameter of the engine, and including means for supporting and attaching to a spreader fastened to an engine.

These means for supporting and attaching a spreader are movable vertically in synchronized manner on the columns.

Furthermore, upper and lower lighting means are installed at each station, the lower lighting means being embedded in the floor and covered by plates of transparent material lying in the plane of the floor.

This lighting does not hinder the movements of operators and enables them to see the bottom portions of the engines under good lighting conditions.

According to other characteristics of the invention, each station includes at least one computer terminal for displaying sequential tasks that are to be carried out by an operator in a given order on the engine in that station, and a series of tools for use by the operator in carrying out those tasks.

Preferably, each station includes at least two computer terminals and two sets of tools installed on either side of the location for the engine in the above-specified station and designed to be used simultaneously by two operators performing identical or different tasks sequentially on the engine.

In addition, each station includes another computer terminal for displaying information relating to the engine that is to be found in that station and to the recipient of the engine.

Furthermore, the workshop also includes a reworking station that is located beside the inspection station under the above-mentioned overhead structure and that serves to receive engines that have been found by testing not to be in compliance with predetermined standards.

The reworking station is not in series with the inspection station, but rather is in parallel with the inspection station so as to enable particular actions to be taken on engines for which testing has been unsatisfactory.

The invention can be better understood and other characteristics, details, and advantages thereof appear clearly on reading the following description made with reference to the accompanying drawings, in which.

Figure 1:
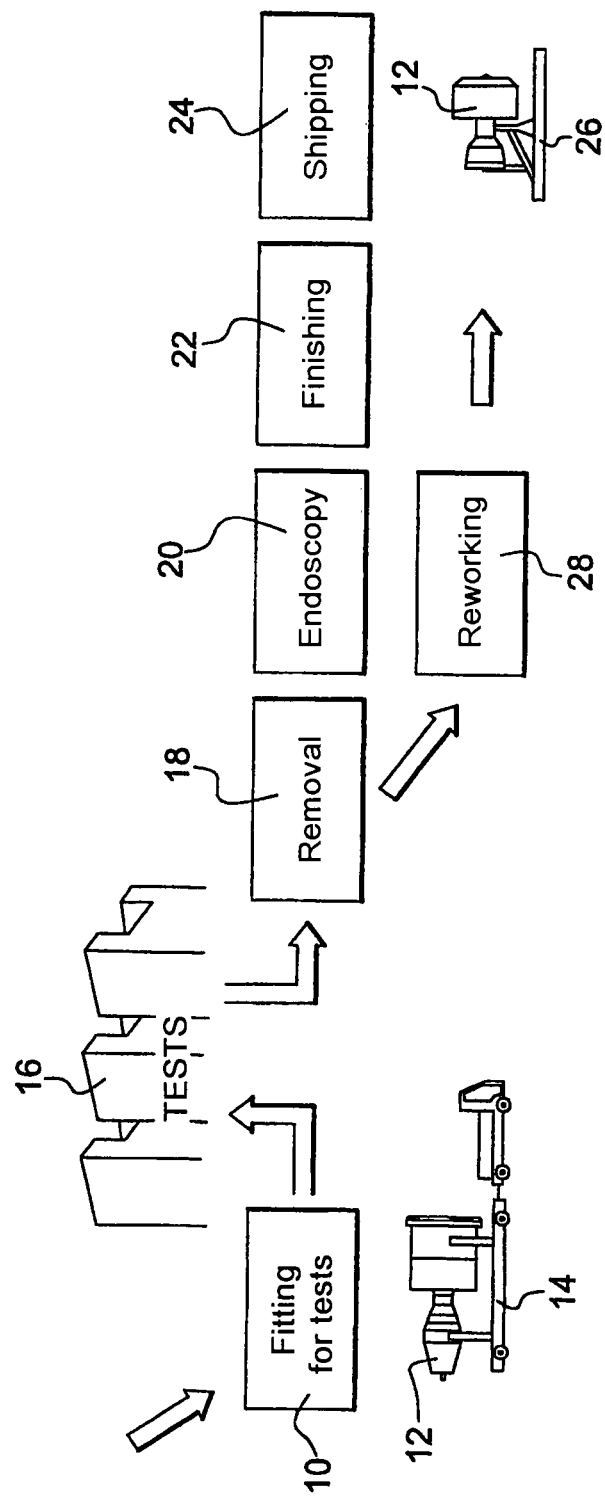
FIG. 1 shows the general organization of a workshop of the invention.

Reference is made initially to FIG. 1, which is a diagram showing the general organization of a workshop of the invention and a general flow chart of the tasks carried out in the workshop.

The first station 10 of the workshop receives engines one by one from an assembly line in order to fit each engine with particular test and measurement means that are used during the testing to which the engine is subjected prior to being shipped to a client, e.g. to an aircraft manufacturer.

In general, the means that are fitted on an engine for these tests comprise starter equipment, an ejector assembly, a cowl rear shroud, a front cone, lubrication and fuel circuit equipment, an air inlet nozzle, and also means for weighing the engine.

The engine 12 fitted-out in this way is placed on a transporter cart 14 and taken to test premises 16 located in an isolated building in which the engine is attached to a strong stationary structure and is subjected to tests involving starting and operating at various speeds.

At the end of this testing, the engine 12 is put back on the cart 14 and returned to the workshop to a station 18 for removing the measurement and test means.

The engine is then transferred to an endoscopic inspection station 20 serving in particular to verify the state of the blades and vanes of the low pressure and high pressure stages of the engine.

The engine is then transferred to a finishing station 22 in which it is prepared for shipping to a client, with the operations carried out in this station comprising in particular emptying the oil tank, the starter, and the accessory gearbox, installing an identification connector, and fitting a cowl rear shroud, a front cone, and a front cone protector, together with means for protecting the sensitive portions of the engine from corrosion.

The engine is then transferred to a shipping station 24 where it is placed in a shipping structure 26 and subjected to visual finishing inspection, after which protective covers are placed on various portions of the engine and the engine is covered with a protective covering.

As shown diagrammatically in FIG. 1, the various stations of the workshop are in alignment along a common axis such that an engine leaving one station penetrates immediately into the following station. The length of time spent by an engine in each of the various stations is the same (and is four hours in an embodiment concerning preparing bypass turbojets).

The workshop also includes a reworking station 26 into which engines are transferred from the removal station 18 if they do not comply with pre-established standards and need to be subjected to particular actions. This reworking station 26 is in parallel with the endoscopy inspection station 20 and thus lies off the normal path followed by engines through the preparation workshop.

Figure 2:
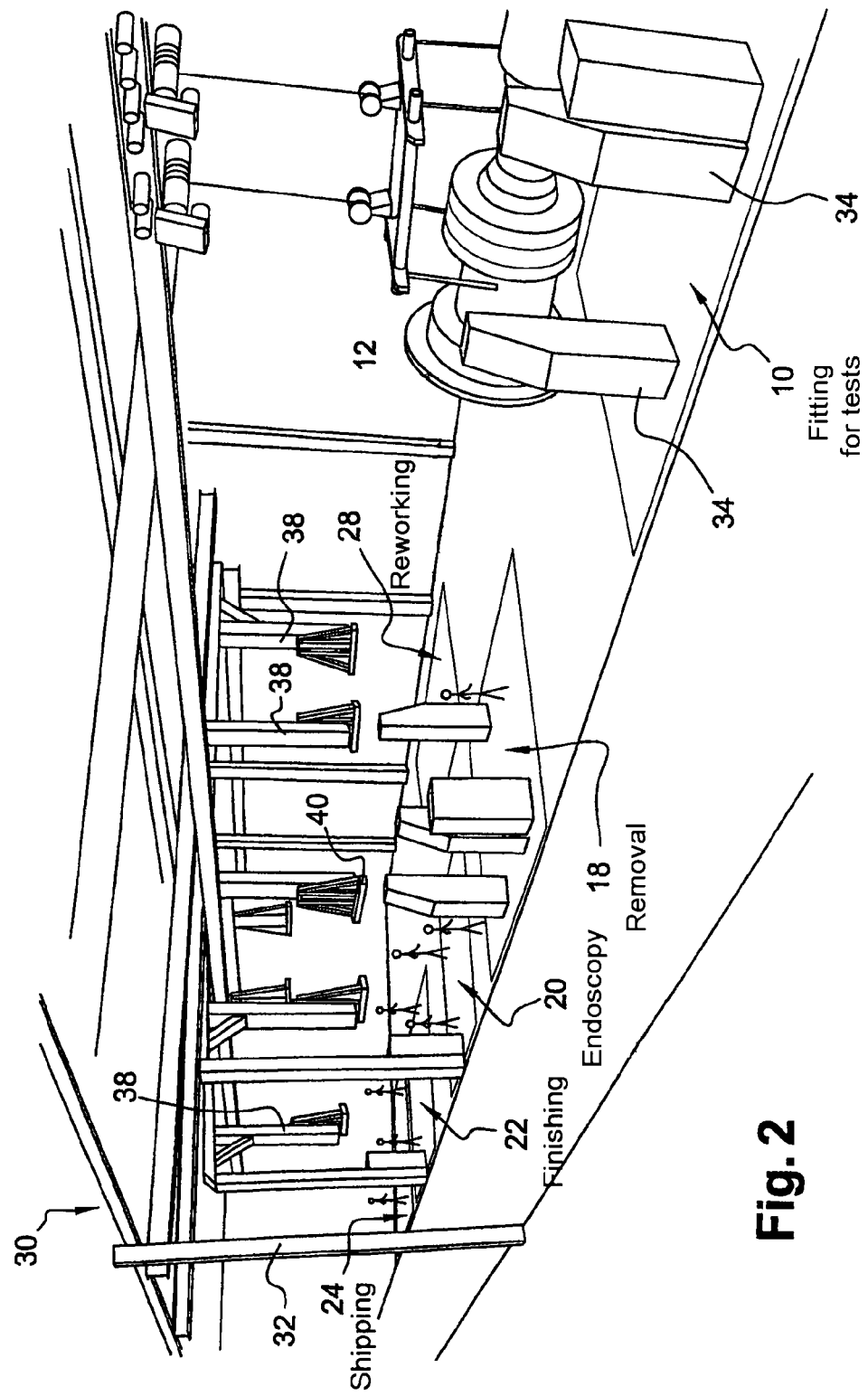
FIG. 2 is a diagrammatic perspective view of a workshop of the invention.
Figure 3:
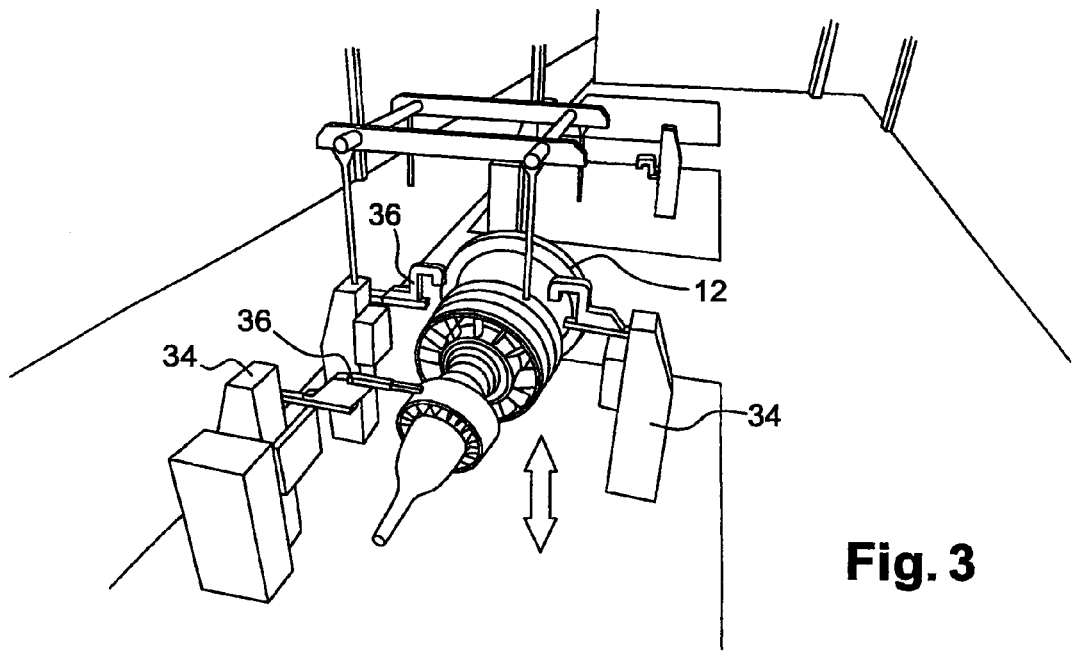
FIG. 3 is a diagrammatic view of the station for fitting test and measurement means on an engine.

Reference is now made to FIG. 2 et seq., which show a practical embodiment of a workshop of the invention.

FIG. 2 shows the particular arrangement of the stations 10, 18, 20, 22, 24, and 28 shown in FIG. 1, and it can be seen that all of these stations have an overhead horizontal structure 30 that is at a height of several meters above the ground and that is supported by vertical pillars 32 that are fastened to the ground. The structure 30 carries all of the means for conveying and handling engines in the workshop, together with means for supporting engines in some of the stations, thereby releasing a large amount of floor space and making it easy for operators to move about in the workshop and within the various stations.

In the fitting and removal stations 10 and 18, the engine support means comprise three vertical uprights 34 that are fastened to the ground on either side of the location for an engine in the corresponding station, with two of these uprights 34 facing each other in register with the intermediate casing of the engine and with the third upright being on one side of the engine in register with the exhaust casing of the engine.

Each vertical upright includes a horizontal arm 36 for fastening to the engine and means for adjusting the height position of said arm on the upright 34, the means for adjusting the positions of the arms on the uprights being synchronized so that all of the arms are constantly to be found in a common horizontal plane.

Figure 4:
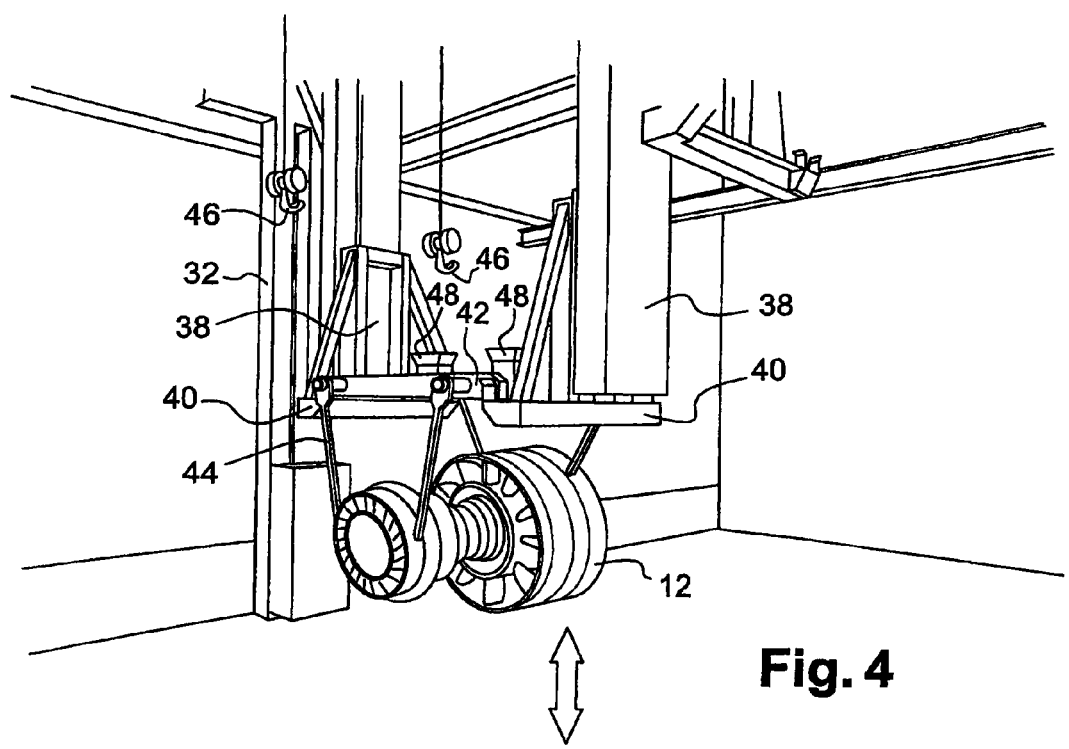
FIG. 4 is a diagram showing one of the inspection and finishing stations.

In the other stations, the engine support means are vertical columns 38 suspended from the top structure 30 and having bottom ends that are located at a certain height above the floor, which height is greater than the outside diameter of an engine, as can be seen in particular in FIG. 4.

Each station 20, 22, or 28 has two of these columns that are placed facing each other on either side of the location for an engine in the corresponding station, these columns carrying means 40 for supporting and attaching a horizontal spreader 42 that is essentially constituted by a frame having downwardly-extending arms 44 attached thereto that are fastened at their bottom ends to the intermediate and exhaust casings of the engine, on either side of the engine.

The means 40 for supporting and attaching spreaders 42 to the vertical columns 38 are adjustable in height in synchronized manner on the two facing columns 38 so that the spreader 32 always remains in a horizontal plane.

The spreaders 42 fastened to the engines are themselves movable from one station to another by means of hoists that are guided on horizontal rails of the top structure 30 and that are connected to the spreaders 42 by cables fitted with hooks 46 at their bottom ends (see FIG. 4, for example), these hooks 46 being designed to be received in funnel-shaped guides 48 fastened to the spreader 42, and to be held in these guides by locking means such as transverse pins moved by actuators.

Figure 5:
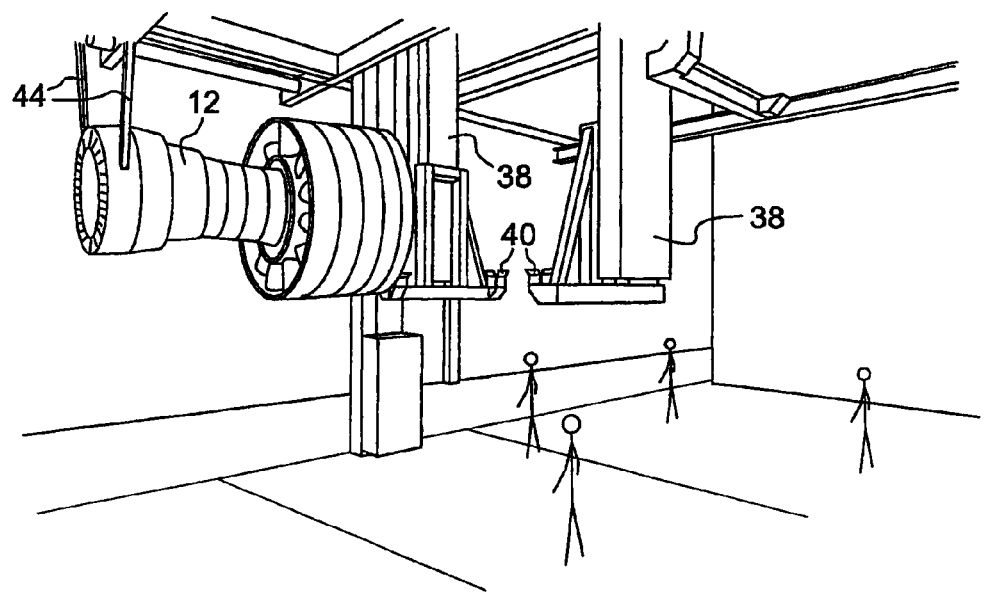
FIG. 5 is a diagram showing an engine leaving the FIG. 4 station.

It can be understood that a hoist enables a spreader 42 having an engine suspended therefrom to be lifted in order to separate the spreader from the support and attachment means 40 of the columns 38 of a station in the workshop, enables the engine to be taken to the following station (see FIG. 5) by moving the hoist along the horizontal rails of the top structure 30, and enables the spreader 42 then to be lowered down to the support and attachment means 40 of the vertical columns 38 of the following station.

The hoists are also used for placing the engines on the support means 34 of the stations 10 and 18, in order to take an engine from the station 10 and place it on a cart 14 for transport to the test premises, and to retrieve an engine from the cart 14 and place it on the support means 34 of the station 18.

When an engine has thus been taken to the station 18, a spreader 42 is fastened to the engine via its arms 44 to enable the engine to be moved all the way to the shipping station 24 by means of a hoist.

The spreader is separated from the engine while it is resting on its shipping structure 26 and it is returned to the removal station 18 in order to be fastened to another engine. A path for returning spreaders from the station 24 to the station 18 is provided on the overhead structure 30 and it enables each spreader to be returned directly to the station 18 along the path followed by the engines.

Figure 6:
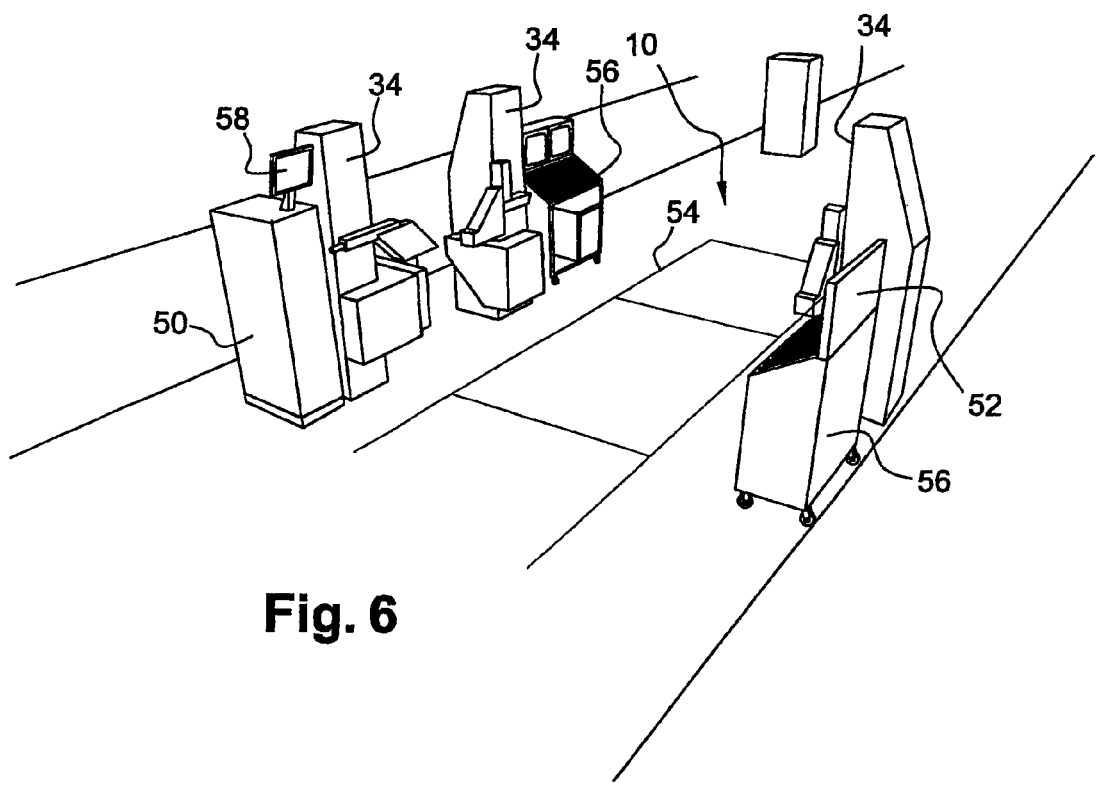
FIG. 6 is a diagram showing the organization of stations for fitting and removing test and measurement means.

FIG. 6 shows a workshop station in greater detail, such as for example the station 10 for fitting measurement and test means on the engine.

In addition to the engine support means 34, this station 10 includes a cabinet 50 for controlling the adjustment of the height of the arm for fastening to the engine, and two computer terminals 52 placed on either side of a location 54 marked on the floor by colored strips and corresponding to a zone for working on an engine when it is carried by the fastener arms of the support means 34. Lighting means are embedded in the floor in the location 54 and are covered by plates of transparent material situated at floor level and on which operators can walk, this arrangement serving to ensure that the bottom portion of an engine is well lighted. Other lighting means are carried by the top structure 30 for lighting the top portion of the engine.

Each computer terminal 52 is fitted on a console 56 that also carries means for storing a set of tools suitable for use by the operator working on the engine.

Another computer terminal is installed in the station, e.g. on the cabinet 50 as shown at 58 in FIG. 6, for the purpose of displaying information relating to the engine and to the locations on the engine of the tasks that are to be carried out.

Figure 7:
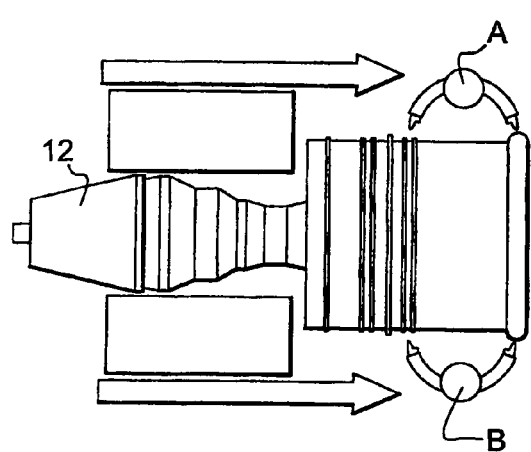
FIGS. 7 and 8 are diagrams showing two operators working on an engine in one of the stations of the workshop, shown in plan view and in end view respectively.
Figure 8:
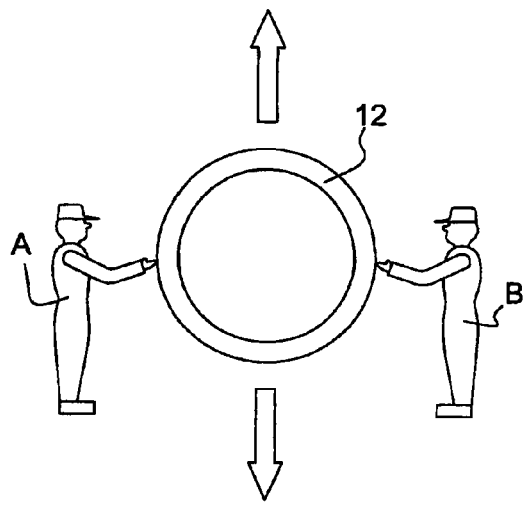
Figure 9:
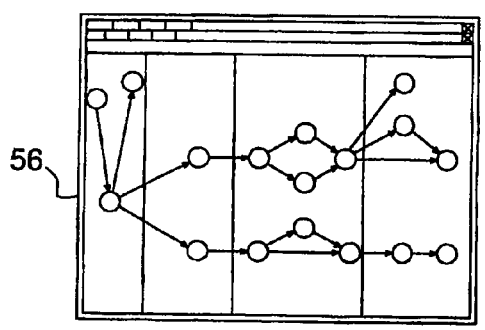
FIG. 9 is a diagram of a computer terminal for displaying the tasks to be carried out on an engine at one of the stations of the workshop.

As shown diagrammatically in FIGS. 7 and 8, two operators A and B can work simultaneously on the engine 12 in the station 10 in order to perform identical or different tasks sequentially in a given order, which order is displayed on the screens of the terminals 56, as shown by way of example in FIG. 9, thereby causing the operators to move from one end of the engine 12 to the other in the direction represented by arrows in FIG. 7.

When the time spent by an engine in each of the various stations of the workshop is four hours, as mentioned above, the display on the screen 56 may be subdivided into four zones of different colors, each having a duration of one hour and each including the references of the operations that are to be carried out on the engine by an operator in the specified order. By using a mouse to click on the number of an operation, an operator can obtain a detailed description of the operation together with additional information about the operation.

Figure 10:
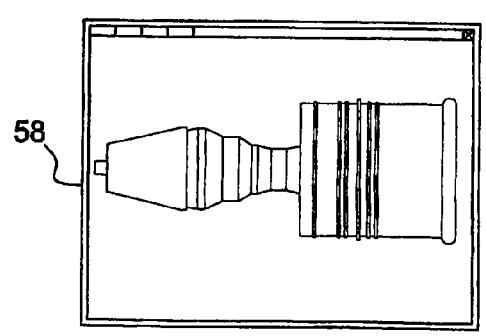
FIG. 10 is a diagram showing another computer terminal for displaying information relating to an engine located in a station of the workshop.

The other screen 58 shown in FIG. 10 displays the shape of an engine in a color that corresponds to the color of the current working zone as displayed on the screen 56, and also displays the locations on the image of the engine for the tasks that are to be carried out during the current time period. The consoles 56 carrying the terminals 52 and the tools are placed at points giving each operator access very quickly, in a few seconds, to the tools needed. Wheeled seats that enable the operators to work while sitting down, whenever that is possible, are also provided in each station, together with other pieces of equipment such as tanks, waste bins, etc.

Each engine is also fitted with a radio frequency identification (RFID) type label having a number that has already been associated with an engine in the central database. When an engine is put into place in one of the stations, information concerning the engine (type, version, airplane, client airline, etc.) is then transmitted graphically to the screen of the station. This also serves to warn operators very quickly of any reallocation of an engine. When an operator has finished an operation, this is declared on the computer terminal and the operation is charged by the computer system to the recipient of the engine. This provides complete traceability of the operations carried out on the engine, together with charging of those operations for accounting purposes.

Naturally, it is possible to vary the number of operators working on an engine in a given station, with this number typically lying in the range 1 to 3 or 4 depending on the tasks that are to be carried out on the engine and on the type of engine.

The operation of a workshop of the invention stems clearly from the above description.

An engine leaving an assembly line is taken on a cart to beside the first station 10 and is then taken from the cart by a hoist, moving it to above the supports 34 of the station 10, and placing it at the appropriate height to enable the fastener arms of those supports to be fastened to the casings of the engine.

The engine may then be fitted with the appropriate measurement and test means. It is then lifted once more by the hoist, moved to above a transport cart located beside the station 10, and placed on the cart in order to be taken to the testing premises 16.

After testing, the engine is returned on the cart to the workshop to beside the station 18, is lifted by a hoist so as to be placed above the support means 34 of the station 18, and is then lowered to the desired height to enable the fastener arms of the supports 34 to be fastened to the casings of the engine. The test and measurement mans are removed from the engine, and then a spreader 42 is lowered by a hoist to above the engine and is fastened thereto by means of its arms 44. The hoist lifts the engine and takes it to the inspection station 20 where it places the spreader 42 on the support and attachment means 40 of the columns 38.

After inspection, the spreader 42 carrying the engine is once more raised by the hoist and taken to the finishing station 22 to enable final pieces of equipment to be fitted on the engine, after which the engine is once more moved by the hoist to the shipping station 24 where it is placed on a transport structure 26. The spreader is then separated from the engine and returned to the removal station 18. The engine 12 is fastened to the transport structure 26 and is covered in its protective covers and covering, and is then ready for shipping to its recipient.

It can be seen that the various tasks performed by the operators are always performed in the same order and that each operator may at all times refer to a computer terminal in order to obtain more details about the operations to be carried out. In addition, all of these operations are associated with timings and each operator is continuously informed about how far he or she is ahead or behind the planned schedule. Total traceability is provided for the operations carried out, since the operators inform the computer system directly after executing each task.

The invention claimed is:

1. A workshop for preparing aeroengines for shipping, the workshop comprising:
    a plurality of stations including:
        a fitting station for fitting measurement and test means on each aeroengine;
        a removal station for removing the measurement and test means;
        an inspection station for inspecting the aeroengines by endoscopy;
        a finishing station for fitting final pieces of equipment on each aeroengine; and
        a shipping station for fitting each aeroengine on a shipping structure and for placing protective coverings on the aeroengine,
    the plurality of stations being arranged in a fixed manner in the workshop along a predetermined path for the aeroengines;
        conveyor and handling means for conveying and handling the aeroengines, which conveyor and handling means are carried by an overhead structure extending over the plurality of stations and comprising:
        placing-and-taking means for placing engines said aeroengines on and for then taking said aeroengines off stationary supports installed in the plurality of stations and configured to give direct access to all portions of the aeroengine, and
        travel means for moving the aeroengines from one station to another; and
        control means for controlling the conveyor and handling means, so that a departure of an aeroengine from any of the plurality of stations is followed substantially without delay by arrival of another aeroengine at that station, with times spent by the aeroengines in the various stations being identical.

2. The workshop according to claim 1, wherein the conveyor and handling means comprises hoists guided in translation on horizontal rails of the overhead structure and connected by cables to spreaders fastened to the aeroengines for placing and retrieving the aeroengines.

3. The workshop according to claim 2, wherein the cables of the hoists include hooks that are received in funnel-shaped guides secured to the spreaders and that are retained in the guides by locking means actuated by actuators.

4. The workshop according to claim 2, further comprising a return circuit for returning spreaders from the shipping station to the removal station.

5. The workshop according to claim 1, wherein the aeroengine supports installed in the fitting and removal stations comprise vertical uprights fastened to a floor on either side of a location provided for one of said aeroengines, each vertical upright carrying a determined horizontal arm for fastening to a casing of said one of the aeroengines, together with adjusting means for adjusting height position of the arms said determined horizontal arm, which adjusting means operate synchronously with adjustment means of horizontal arms of other vertical uprights such that all of the horizontal arms are always in a common horizontal plane.

6. The workshop according to claim 5, wherein each fitting station and removal station includes two front uprights placed in register with an intermediate casing of one of said aeroengines, and one rear upright placed on one side in register with an exhaust casing of said one of the aeroengines.

7. The workshop according to claim 5, wherein, at the fitting station, the overhead structure includes horizontal rails for moving a hoist for:
    taking one of said aeroengines from a transport cart situated beside said fitting station,
    moving said one of the aeroengines to bring it above the fitting station,
    lowering said one of the aeroengines to the level of the horizontal arms of the uprights, and subsequently
    lifting said one of the aeroengines above said fitting station,
    moving said one of the aeroengines, and
    placing said one of the aeroengines on a cart for transporting said one of the aeroengines to test premises.

8. The workshop according to claim 5, wherein, at the removal station, the overhead structure includes horizontal rails for moving a hoist for:
    taking an aeroengine from a transport cart located beside the removal station,
    moving one of said aeroengines to bring it above the support uprights of the removal station,
    lowering said one of the aeroengines to a level of the horizontal arms of the uprights, and subsequently,
    lifting said one of the aeroengines above the removal station and,
    taking said one of the aeroengines to the inspection station.

9. The workshop according to claim 1, wherein the aeroengine supports installed in the inspection and finishing stations comprise a pair of vertical columns which are:
    situated on either side of a location provided for one of said aeroengines in said inspection and finishing stations, and
    suspended from the overhead structure,
    the pair of vertical columns having bottom ends situated above a floor at a height that is greater than the diameter of said one of the aeroengines, and including means for supporting and attaching to a spreader that is fastened to said one of the aeroengines.

10. The workshop according to claim 9, wherein the support and attachment means of the spreader are movable vertically in synchronized manner on columns of anyone of said plurality of stations.

11. The workshop according to claim 1, wherein upper and lower lighting means are installed at each of said plurality of stations, the lower lighting means being embedded in a floor having a plane and covered by plates of transparent material lying in the plane of the floor.

12. The workshop according to claim 1, wherein each of said plurality of stations includes:
- at least one computer terminal for displaying sequential tasks that are to be carried out by an operator in a given order on one of said engines in every of said plurality of stations, and
- a series of tools for use by the operator in carrying out said tasks.

13. The workshop according to claim 12, wherein each of said plurality of stations includes at least two computer terminals and two sets of tools installed on either side of the location for one of said aeroengines in said station and configured to be used simultaneously by two operators performing identical or different tasks sequentially on said one of the aeroengines.

14. The workshop according to claim 1, wherein each of said plurality of stations includes a computer terminal for displaying information relating to one of said aeroengines situated in that station and provided for said one of the aeroengines.

15. The workshop according to claim 1, wherein a reworking station is installed beside the inspection station under the overhead structure and is configured to receive aeroengines that testing has found to be out of compliance with predetermined standards.

* * * * *

UNITED STATES PATENT AND TRADEMARK OFFICE
CERTIFICATE OF CORRECTION

| | | |
|---|---|---|
| PATENT NO. | : 8,776,360 B2 | Page 1 of 1 |
| APPLICATION NO. | : 13/257076 | |
| DATED | : July 15, 2014 | |
| INVENTOR(S) | : Bernard Francois Carcy et al. | |

It is certified that error appears in the above-identified patent and that said Letters Patent is hereby corrected as shown below:

IN THE SPECIFICATION:

In column 7, line 11, change "mans" to --means--;

IN THE CLAIMS:

In column 7, line 58, delete "engines";
  line 62, after "and" insert --,--.

In column 8, line 23, delete "the arms";
  line 63, after "and" insert --,--.

Signed and Sealed this
Thirtieth Day of December, 2014

Michelle K. Lee
*Deputy Director of the United States Patent and Trademark Office*